(12) United States Patent
Kim et al.

(10) Patent No.: US 7,967,346 B2
(45) Date of Patent: Jun. 28, 2011

(54) SLIDER MECHANISMS FOR OPENING AND CLOSING PORTABLE TERMINALS

(75) Inventors: Tae Hyun Kim, Bucheon-si (KR); Jae Man Hwang, Bucheon-si (KR)

(73) Assignee: Laird Technologies Korea YH, Bucheon-si, Gyeonggi-do (KR)

( * ) Notice: Subject to any disclaimer, the term of this patent is extended or adjusted under 35 U.S.C. 154(b) by 952 days.

(21) Appl. No.: 11/834,251

(22) Filed: Aug. 6, 2007

(65) Prior Publication Data
US 2009/0035056 A1    Feb. 5, 2009

Related U.S. Application Data

(60) Provisional application No. 60/952,849, filed on Jul. 30, 2007.

(51) Int. Cl.
*E05C 19/06*    (2006.01)
(52) U.S. Cl. .................... 292/80; 292/DIG. 6
(58) Field of Classification Search .......... 292/80, 292/163, 164, 177, 179, DIG. 61 X, 302
See application file for complete search history.

(56) References Cited

U.S. PATENT DOCUMENTS

| | | | |
|---|---|---|---|
| 3,955,595 A * | 5/1976 | Modes | 137/517 |
| D260,234 S | 8/1981 | Johnson, Jr. | |
| D280,596 S | 9/1985 | Keeler | |
| 4,675,948 A * | 6/1987 | Bengtsson | 24/115 G |
| 5,715,932 A * | 2/1998 | Motoyama et al. | 200/521 |
| D423,916 S | 5/2000 | Kalat | |
| D438,782 S | 3/2001 | Kalat | |
| 6,370,362 B1 | 4/2002 | Hansen et al. | |
| D457,931 S | 5/2002 | Kalat | |
| 6,773,002 B2 * | 8/2004 | Adoline et al. | 267/168 |
| 6,822,871 B2 | 11/2004 | Lee et al. | |
| 7,003,104 B2 | 2/2006 | Lee | |
| 7,722,281 B2 * | 5/2010 | Naslund et al. | 403/321 |
| 2003/0153280 A1 | 8/2003 | Kopp et al. | |
| 2005/0078817 A1 | 4/2005 | Lee | |
| 2007/0091555 A1 | 4/2007 | Lee | |
| 2008/0058039 A1 | 3/2008 | Lee et al. | |
| 2008/0073196 A1 | 3/2008 | Chung | |
| 2008/0146297 A1 * | 6/2008 | Ho | 455/575.4 |
| 2009/0029749 A1 | 1/2009 | Lee | |

FOREIGN PATENT DOCUMENTS

CN    1961491    5/2007

(Continued)

*Primary Examiner* — Carlos Lugo
*Assistant Examiner* — Mark Williams
(74) *Attorney, Agent, or Firm* — Harness, Dickey & Pierce, P.L.C.

(57) ABSTRACT

Exemplary embodiments are provided of slider mechanisms for slidably opening and closing portable communications terminals. In one exemplary embodiment, a portable communications terminal includes a main body and a slider body sliding on the main body. The slider mechanism includes a first slider member fixed to one of the main body and slider body and a second slider member fixed to the other one. The second slider member is slidably engaged with the first slider member. A zigzag spring is disposed between the first and second slider members. One end portion of the zigzag spring is rotatably supported on one of the first and second slider members and the other end thereof is rotatably supported on the other one of the first and second slider members. The zigzag spring is formed of a first zigzag portion and a second zigzag portion having spring characteristics different from the first zigzag portion.

18 Claims, 13 Drawing Sheets

FOREIGN PATENT DOCUMENTS

| | | |
|---|---|---|
| CN | 101370040 A | 2/2009 |
| EP | 174555 | 12/2008 |
| EP | 2020804 A1 | 2/2009 |
| JP | 61-24893 | 2/1986 |
| JP | 61-58746 | 4/1986 |
| JP | 02-500535 | 2/1990 |
| JP | 08-145100 | 6/1996 |
| JP | 10-190795 | 7/1998 |
| JP | 2006-050204 | 2/2006 |
| JP | 2008501288 | 1/2008 |
| KR | 20-0308165 | 3/2003 |
| KR | 319967 | 7/2003 |
| KR | 345703 | 3/2004 |
| KR | 20040044213 | 5/2004 |
| KR | 20-0414034 | 4/2006 |
| KR | 10-0627605 | 9/2006 |
| WO | WO88/03617 | 5/1988 |
| WO | WO 03/067776 A1 | 8/2003 |
| WO | WO 2006/031078 A1 | 3/2006 |

\* cited by examiner

SLIDER MECHANISMS FOR OPENING AND CLOSING PORTABLE TERMINALS

CROSS-REFERENCE TO RELATED APPLICATION

This application claims the benefit of U.S. Provisional Application No. 60/952,849 filed Jul. 30, 2007. The disclosure of the above application is incorporated herein by reference.

FIELD

The present disclosure relates to slider type portable terminals. More specifically, the present disclosure relates to slider mechanisms for slidably opening and closing portable terminal, such as portable communications terminals and electronic devices.

BACKGROUND

The statements in this section merely provide background information related to the present disclosure and may not constitute prior art.

Recently, as portable wireless terminals have been increasingly popularized, users need additional functions to their tastes even in opening and closing operations of the terminal, along with its inherent functions of wireless communications.

In response to these needs, portable terminals have been developed into a bar type, flip type, flip-up type, folder type, and the like. In recent years, the folder type has been used most widely. This is because the folder type terminal has a space sufficient enough to accommodate a wide LCD module as its display device and can be carried in a folded state to thereby provide a good portability, as compared with other types of terminals.

In more recent years, a slider type terminal has been introduced, which can be equipped with an LCD module display device having a similar size to the folder type. Simultaneously, the slider mechanism thereof can contribute to miniaturization of portable terminals.

This slider type terminal is structured such that a sub-body corresponding to a cover is slidably opened and closed on a main body, thereby providing additional advantages of slidably opening and closing, while maintaining the merits of the existing folder type terminal.

For example, Korean Utility Model Registration No. 0308165 discloses a slider-type portable wireless terminal. The terminal disclosed in the above application includes a guide means for guiding a slider body on a main body and at least one resilient means installed between the slider body and the main body such that its resilient force can be exerted in opening or closing direction with respect to a certain sliding point of the slider body. In addition, when the slider body is completely opened or closed, it can remain in its opened or closed state due to the resilient means, without any separate stopper. The resilient means employs a torsion spring, one end portion of which is fixed to the main body and the other end thereof is fixed to the slider body.

In this slider mechanism, the torsion spring must exert resiliency to the slider body over the whole range of traveling, and the torsion spring is to be compressed and restored repeatedly over a wide range of amplitude. Therefore, a torsion spring expandable over a wide length is used, but this torsion spring has a smaller resilient force. In order to compensate for the deficient resilient force, two torsion springs are employed.

But the torsion spring is compressed and restored in a wide range and thus easily aged due to fatigue caused by the repeated operations. Consequently, the torsion spring comes to lose its normal function or leads to an earlier failure.

In addition, this type of slider mechanism needs at least two torsion springs and further each torsion spring requires at least two windings, for the purpose of desired opening and closing operations. It should be noted here that the space between the main body and the slider body varies with the diameter of spring wire and the number of windings of the torsion spring. That is, as the wire diameter increases and/or the winding numbers increases, the spacing between the main body and the slider body is inevitably widened. For example, in case where the torsion spring has a wire diameter of 0.5 millimeters and two windings, the spacing between the main body and the slider body must be 1.0 millimeter at minimum. Consequently, the portable terminal becomes bulky and thus its portability becomes worse.

Furthermore, in case of this type of slider mechanism using a torsion spring, the elastic force varies with the angle of the torsion spring. Thus, it is not easy to control the sliding force formed between the main body and the slider body. That is, the portable terminal itself may receive impact and thus the service life thereof will be shortened if any separate impact absorber or the like is not provided.

SUMMARY

According to various aspects, exemplary embodiments are provided of slider mechanisms for slidably opening and closing portable communications terminals. In one exemplary embodiment, a portable communications terminal includes a main body and a slider body sliding on the main body. The slider mechanism includes a first slider member fixed to one of the main body and slider body and a second slider member fixed to the other one. The second slider member is slidably engaged with the first slider member. A zigzag spring is disposed between the first and second slider members. One end portion of the zigzag spring is rotatably supported on one of the first and second slider members and the other end thereof is rotatably supported on the other one of the first and second slider members. The zigzag spring is formed of a first zigzag portion and a second zigzag portion having spring characteristics different from the first zigzag portion.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
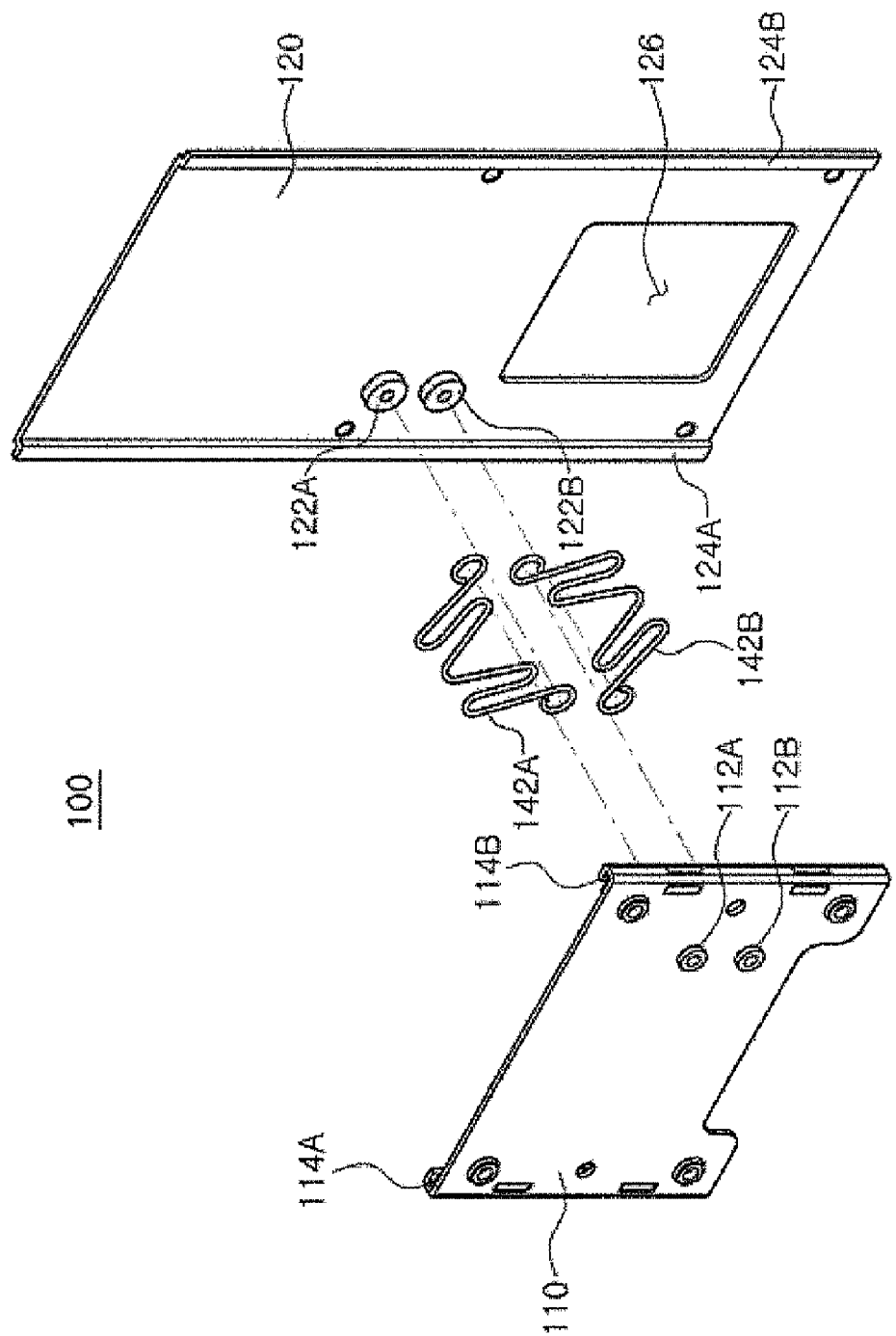
FIG. 1 is an exploded perspective view showing a slider mechanism for opening and closing a portable terminal, according to an exemplary embodiment of the present disclosure.

The following description is merely exemplary in nature and is not intended to limit the present disclosure, application, or uses. It should be understood that throughout the drawings, corresponding reference numerals indicate like or corresponding parts and features.

As disclosed herein, various exemplary embodiments provide slider mechanisms for slidably opening and closing portable communications terminals. In one exemplary embodiment, a portable communications terminal includes a main body and a slider body sliding on the main body. The slider mechanism includes a first slider member fixed to one of the main body and slider body and a second slider member fixed to the other one. The second slider member is slidably engaged with the first slider member. A zigzag spring is disposed between the first and second slider members. One end portion of the zigzag spring is rotatably supported on one of the first and second slider members and the other end thereof is rotatably supported on the other one of the first and second slider members. The zigzag spring is formed of a first zigzag portion and a second zigzag portion having spring characteristics different from the first zigzag portion.

Accordingly, exemplary embodiments of the present disclosure may be provided that solve one or more of the problems in the art. For example, exemplary embodiments may include a slider mechanism using a zigzag spring for slidably opening and closing a slider-type portable terminal, thereby enabling to minimize (or at least reduce) the thickness of the portable terminal while allowing for a smooth sliding operation. In one such exemplary embodiment, there is provided a slider mechanism for slidably opening and closing an electronic device. The electronic device includes a first body and a second body capable of sliding relative to or on the first body. In this example, the slider mechanism includes a first slider member capable of being fixed to the first body, and a second slider member capable of being fixed to the second body. The second slider member is slidably engaged with the first slider member. A zigzag spring is disposed between the first and second slider members. One end portion of the zigzag spring is rotatably supported on the first slider member and the other end thereof is rotatably supported on the second slider body. The zigzag spring is compressed and restored while the first and second slider members slide linearly against each other. The zigzag spring includes a first zigzag portion and a second zigzag portion having spring characteristics different from the first zigzag portion.

In an exemplary embodiment, the zigzag spring includes a pair of zigzag springs disposed so as not to interfere with each other.

In an exemplary embodiment, the first zigzag portion has a spring coefficient different from that of the second zigzag portion.

In an exemplary embodiment, the first zigzag portion has a zigzag pitch different from that of the second zigzag portion.

In an exemplary embodiment, the zigzag spring has an 'M'-shape in general.

In an exemplary embodiment, the first zigzag portion has a cross-sectional shape different from that of the second zigzag portion.

In an exemplary embodiment, the zigzag spring has a circular, oval or rectangular cross-section.

In an exemplary embodiment, the electronic device includes a portable communications terminal.

In an exemplary embodiment, the first slider member is formed integrally with the first body of the electronic device, and the second slider member is formed integrally with the second body of the electronic device.

According to another aspect of the present disclosure, there is provided a slider mechanism for slidably opening and closing an electronic device. The electronic device has a first body and a second body linear-slidably combined with the first body. In an exemplary embodiment, the slider mechanism generally includes a zigzag spring disposed between the first and second bodies. One end portion of the zigzag spring is rotatably supported on the first body, and the other end portion of the zigzag spring is rotatably supported on the second body. The zigzag spring is compressed and restored while the first and second bodies slide linearly against each other. The zigzag spring includes a first zigzag portion and a second zigzag portion having a different spring characteristic from the first zigzag portion.

In an exemplary embodiment, the zigzag spring includes a pair of zigzag springs disposed so as not to interfere with each other.

In an exemplary embodiment, the zigzag spring has an 'M'-shape in general.

In an exemplary embodiment, the first zigzag portion has a spring coefficient different from that of the second zigzag portion.

In an exemplary embodiment, the first zigzag portion has a zigzag pitch different from that of the second zigzag portion.

In an exemplary embodiment, the zigzag portion has a circular, oval or rectangular cross-section.

In an exemplary embodiment, the first zigzag portion has a cross-sectional shape different from that of the second zigzag portion.

In an exemplary embodiment, the electronic device includes a portable communications terminal.

According to a further aspect of the present disclosure, there is provided a portable communications terminal having a main body and a slider body. The slider body is slidably opened and closed with respect to the main body. The portable communications terminal also includes a first slider member fixed to the main body and a second slider member fixed to the slider body. The second slider member is linear-slidably engaged with the first slider member. A zigzag spring is disposed between the first and second slider members. One end portion of the zigzag spring is rotatably supported on the first slider member, and the other end portion of the zigzag spring is rotatably supported on the second slider member. The zigzag spring is compressed and restored while the first and second slider members slide linearly against each other. The zigzag spring includes a first zigzag portion and a second zigzag portion having spring characteristics different from the first zigzag portion.

In an exemplary embodiment, the zigzag spring includes a pair of zigzag springs disposed so as not to interfere with each other.

In an exemplary embodiment, the first zigzag portion has a spring coefficient different from that of the second zigzag portion.

In an exemplary embodiment, the first zigzag portion has a zigzag pitch different from that of the second zigzag portion.

In an exemplary embodiment, the zigzag spring has an 'M'-shape in general.

In an exemplary embodiment, the zigzag spring has a circular, oval or rectangular cross-section.

In an exemplary embodiment, the first zigzag portion has a cross-sectional shape different from that of the second zigzag portion.

In an exemplary embodiment, the main body and the first slider member are formed integrally with each other, and the slider body and the second slider member are formed integrally with each other.

Other aspects of the present disclosure relate to methods associated with slider mechanisms for portable communications terminals and electronic devices. Further aspects relate to methods of opening and closing portable communications terminals having slider mechanisms.

With reference now to the figures, FIG. 1 is an exploded perspective view showing a slider mechanism for opening and closing a portable terminal, according to an exemplary embodiment of the present disclosure, where the slider mechanism of this particular exemplary embodiment is denoted generally by reference numeral 100.

Referring to FIG. 1, the slider mechanism 100 includes a slider base 110 formed of a suitable material, such as, for example, a plastic material. The slider mechanism 100 also includes a sliding plate 120 also formed of a suitable material, such as, for example, a plastic material. At least one resilient member 142A, 142B is disposed in a space formed generally between the slider base 110 and the sliding plate 120. The sliding plate 120 may also include a window or opening 126 through which a display screen may become visible when the terminal is opened. Although not illustrated, it should be understood to those skilled in the art that the slider base 110 and the sliding plate 120 may be attached to a main body and a slider body of a portable terminal through various techniques, such as screw-fastening, snap-inserting, adhesive-bonding, welding, and the like.

The terms "main body" and "slider body" used throughout the description and claims generally refer to and mean a stationary portion and a sliding portion of a portable terminal respectively when a user operates to open and close the terminal. But the user may also choose to move the main body relatively away from the slider body while holding the slider body stationary to accomplish the opening and closing of the terminal. Or the user may move both the main body and the slider body relative to each other to open and close the terminal. Accordingly, the particular manner and variations by which a user chooses to open and close the terminal should not be viewed as limitations to the scope of the present disclosure.

In a typical slider-type portable terminal, a keypad is mounted on the face of the main body, and a main board is housed inside of the main body to perform various functions. The slider body is equipped with a display screen, which as noted above may become visible through a window or opening 126 in the sliding plate 120 when the terminal is opened. The main body and the slider body are electrically connected with each other through a flexible PCB.

It should be understood to those skilled in the art that the "slider base 110" may become an integral part of the main body of a terminal, or separately formed and fixed to the main body. In addition, the "sliding plate" may become an integral part of the slider body of the terminal, or separately formed and fixed to the slider body.

The slider mechanism 100 of the exemplary embodiment shown in FIG. 1 includes at least one resilient member for controlling the sliding operation of the sliding plate 120 against the slider base 110, for example, a first resilient member 142A (shown to the left side of FIG. 1) and a second resilient member 142B (shown to the right side of FIG. 1).

One end portion of the first resilient member 142A is supported on the slider base 110. The other end portion of the first resilient member 142A is supported on the sliding plate 120. Similarly, one end portion of the second resilient member 142B is supported on the slider base 110. The other end portion of the second resilient member 142B is supported on the sliding plate 120. For helping achieve a smooth sliding operation and minimization (or at least reduction) of the mechanism thickness, as illustrated in FIGS. 2 to 4, the first and second resilient members 142A and 142B are disposed in such a manner that two resilient members 142A and 142B are not overlapped during the sliding operation of the terminal.

As illustrated in FIG. 1, both ends of the first resilient member 142A are rotatably supported on the slider base 110 and the sliding plate 120 by means of rotational supports 112A and 122A. Both ends of the second resilient member 142B are rotatably supported on the slider base 110 and the sliding plate 120 by means of rotational supports 112B and 122B. In this exemplary embodiment, the rotational supports 112A, 122A, 112B and 122B employ a rivet having a groove formed around the rivet, where the ends of the resilient members are rotatably wrapped and supported. Furthermore, the rivet preferably has a height substantially equal to or less than the sectional thickness of the respective resilient members 142A and 142B in order to minimize (or at least reduce) the overall thickness of portable terminals.

In this exemplary embodiment, two resilient members are illustrated. But a single resilient member may be employed to provide for operations and effects corresponding to the illustrated two resilient members.

Figure 2:
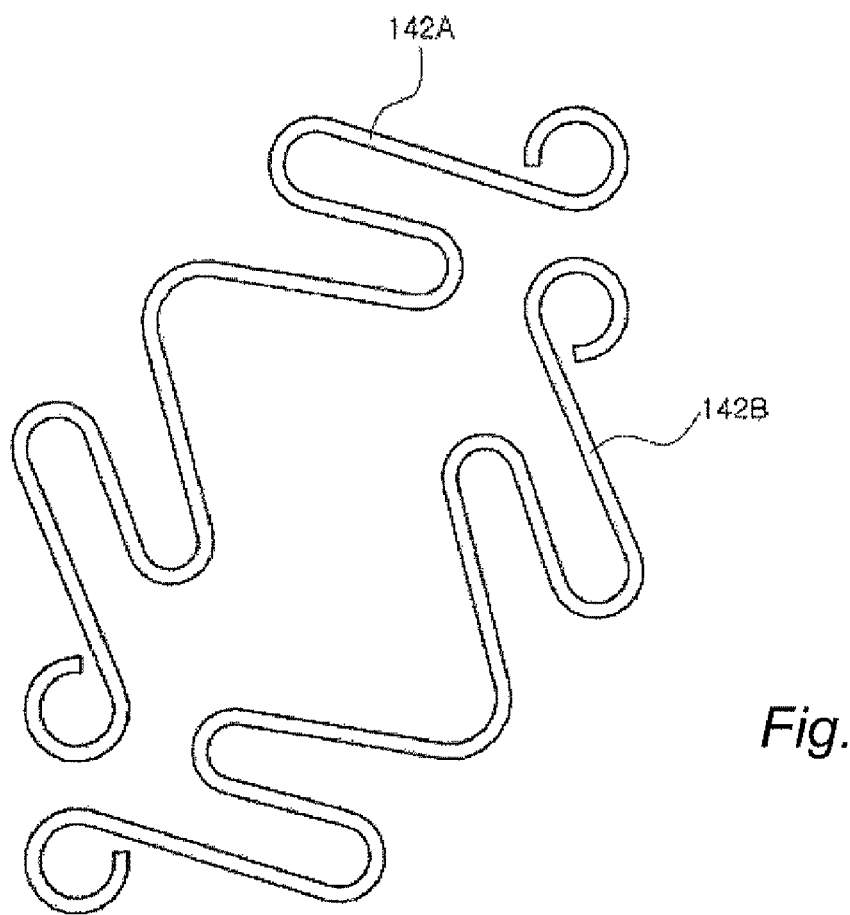
FIGS. 2 to 4 illustrate an exemplary resilient member used in the slider mechanism shown in FIG. 1 when in the closed state, during the opening and in the open state respectively of the terminal.
Figure 3:
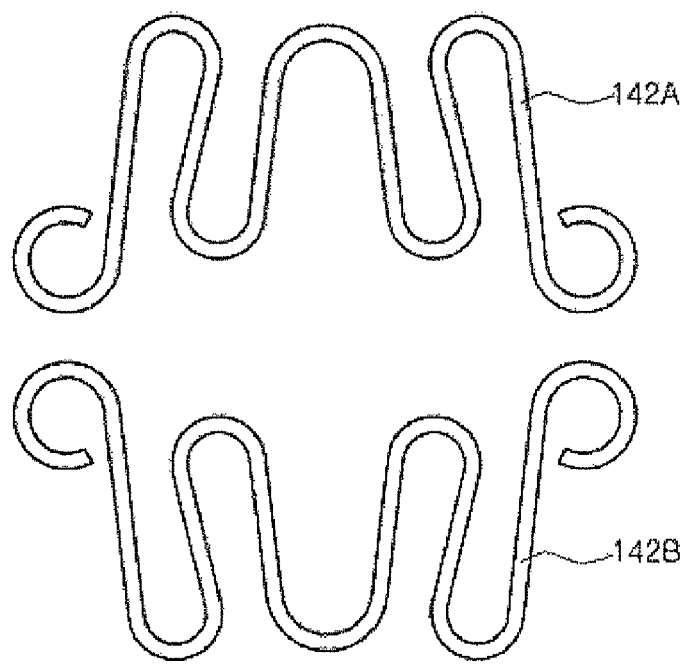
Figure 4:
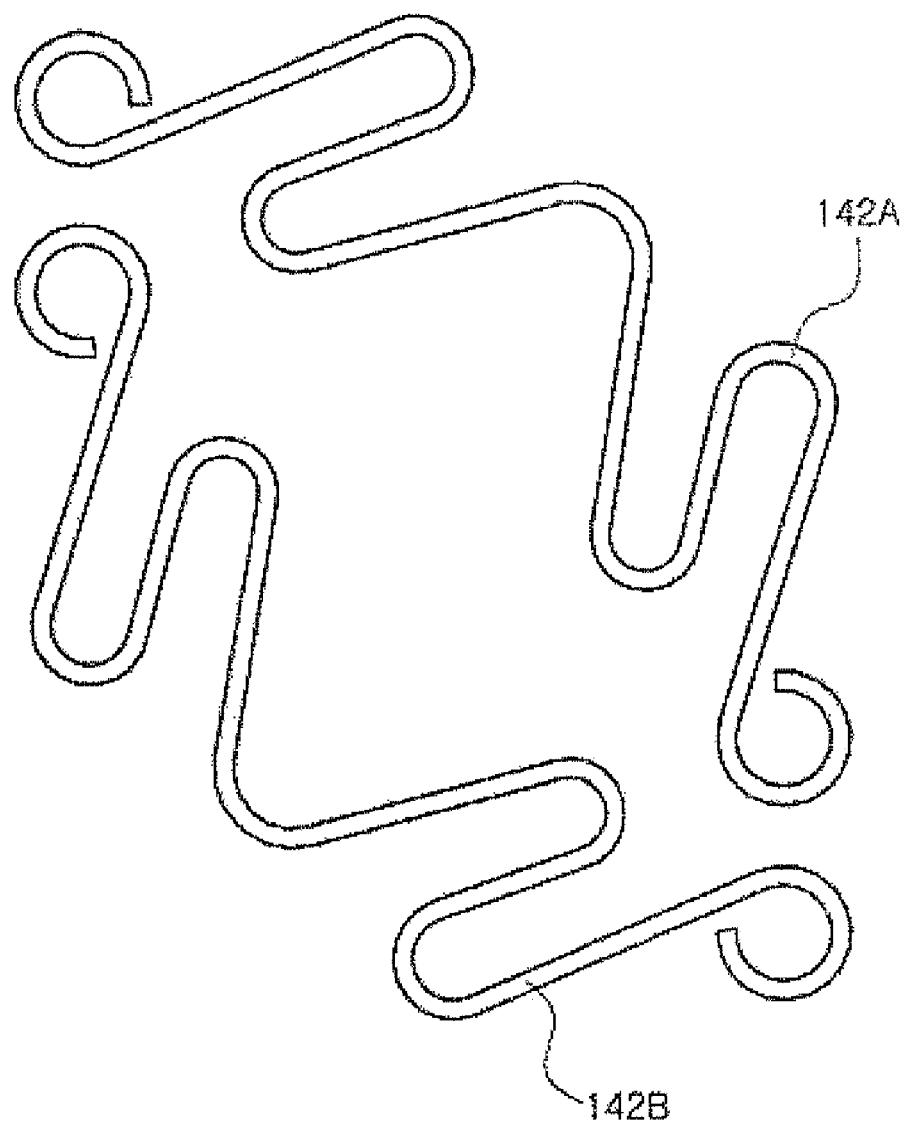
Figure 5:
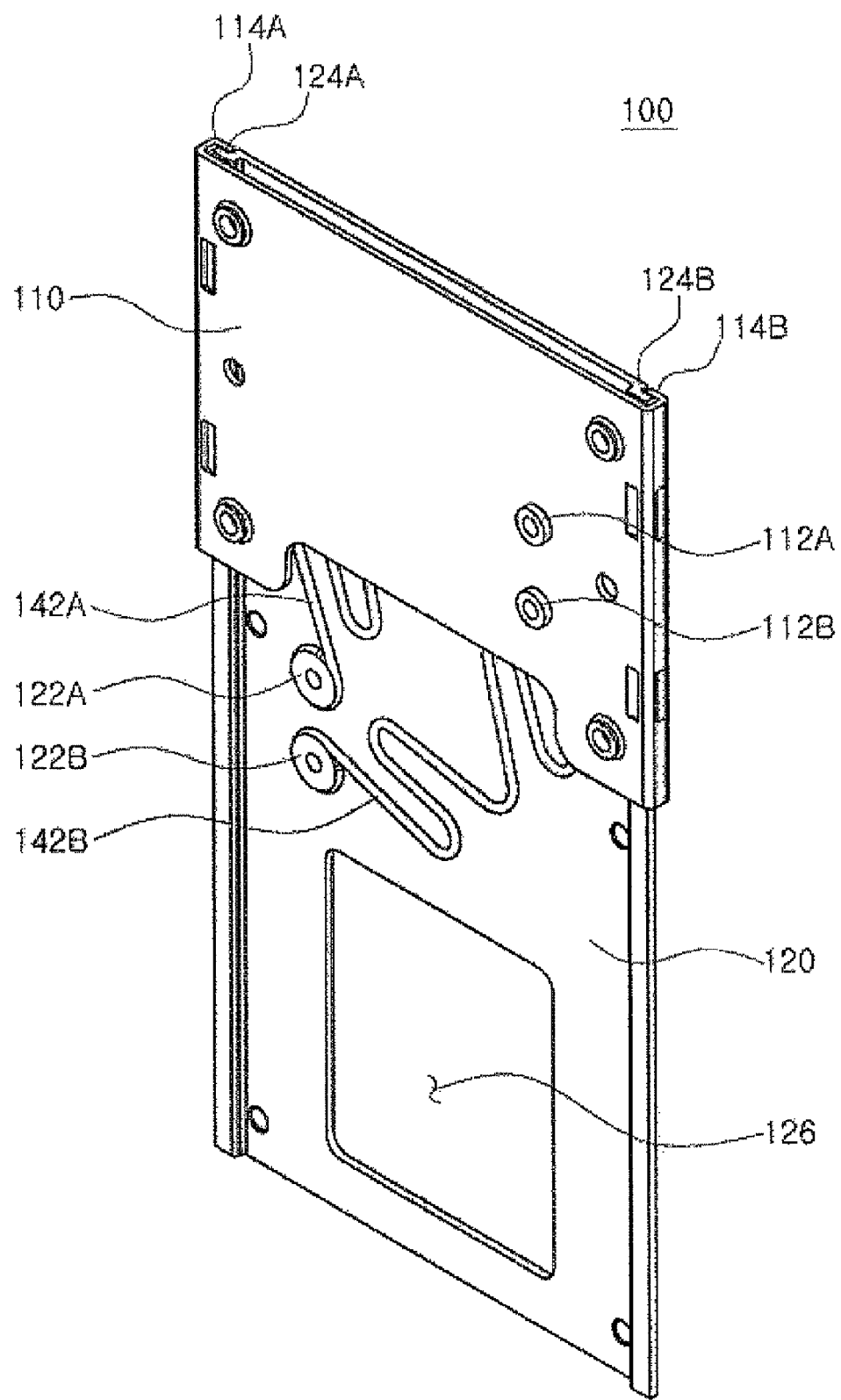
FIG. 5 is a perspective view of the slider mechanism when the portable terminal is completely closed.
Figure 6:
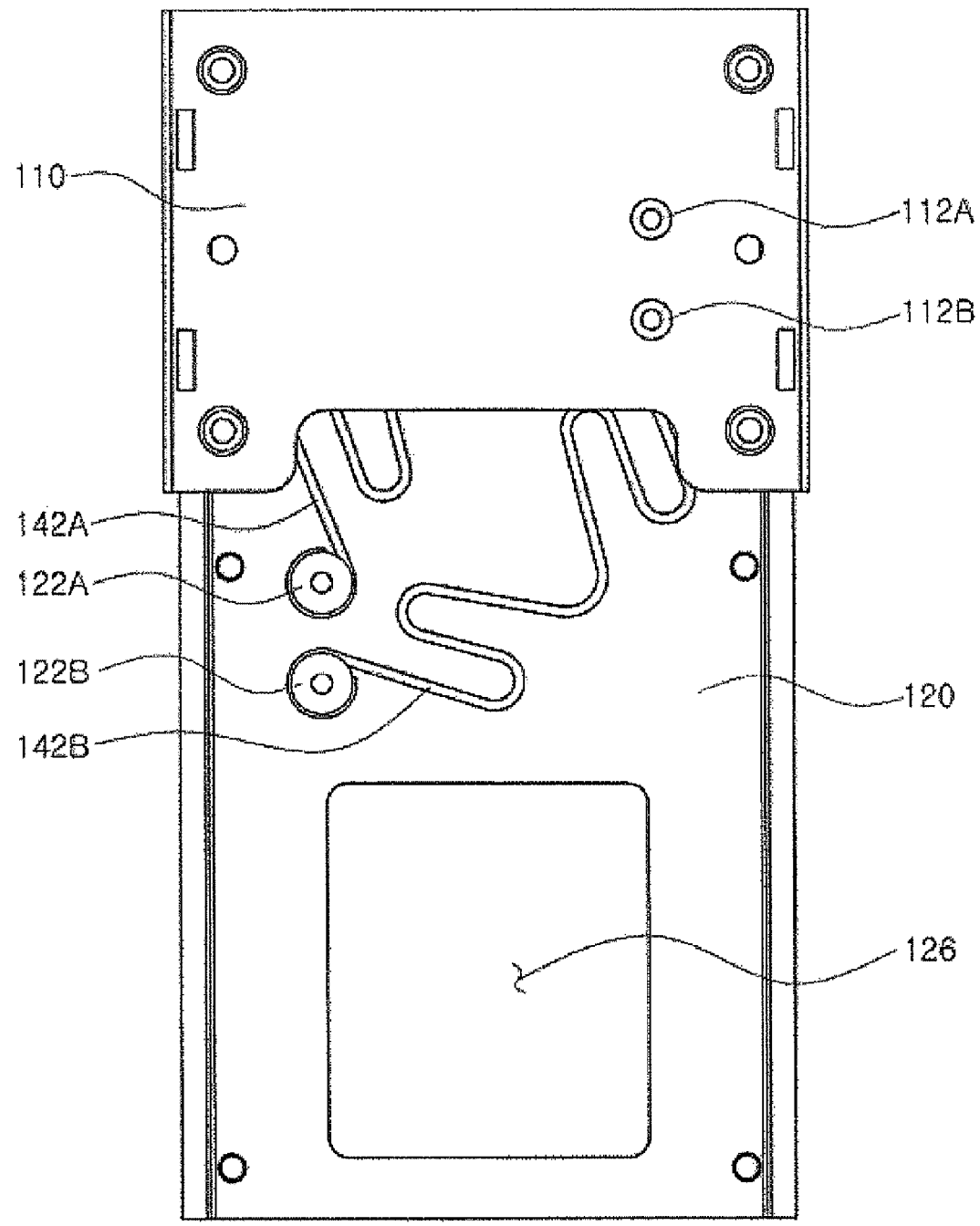
FIG. 6 is a front view of the slider mechanism shown in FIG. 5.
Figure 7:
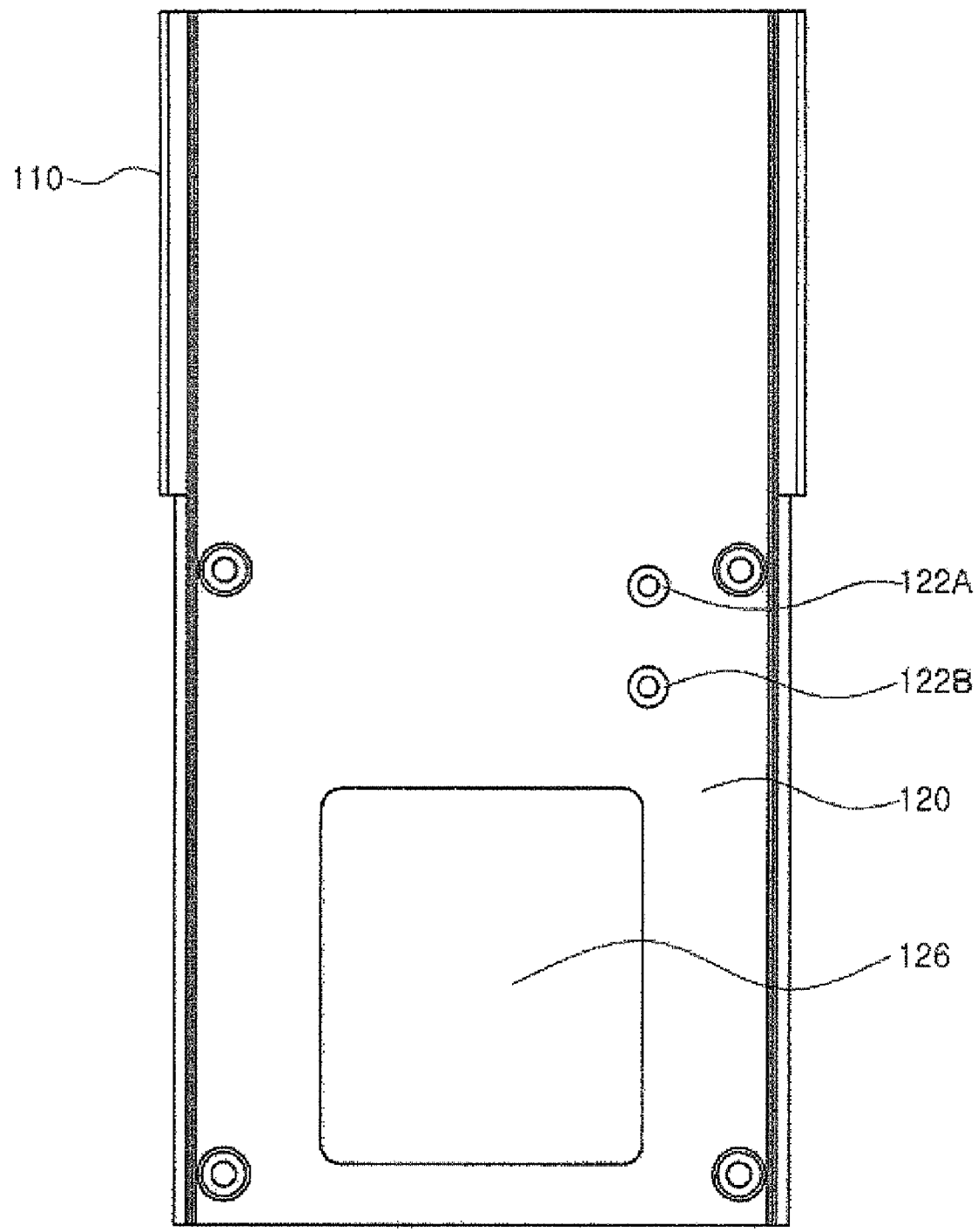
FIG. 7 is a rear view of the slider mechanism shown in FIG. 5.
Figure 8:
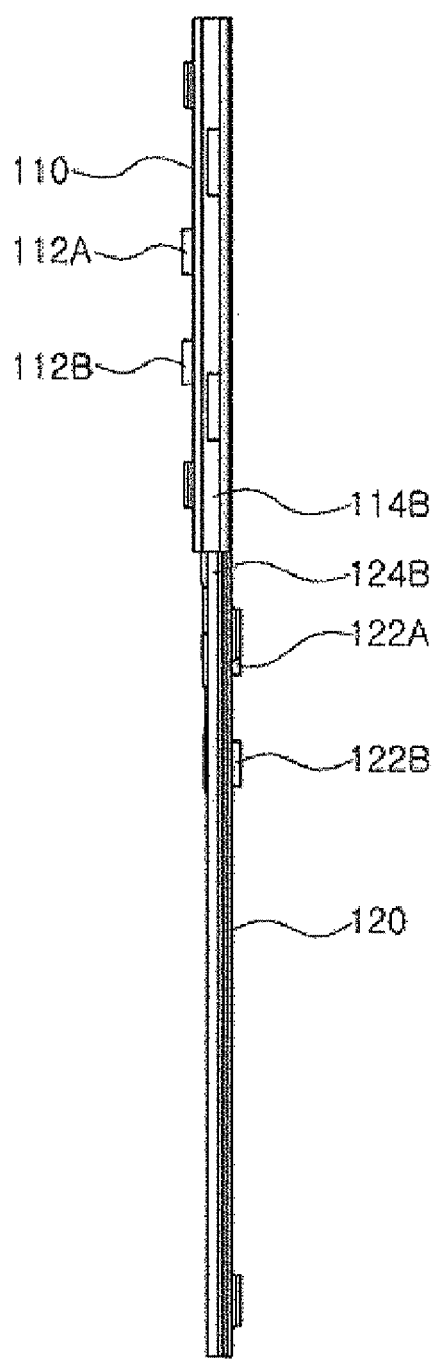
FIG. 8 is a left side view of the slider mechanism shown in FIG. 5.
Figure 9:
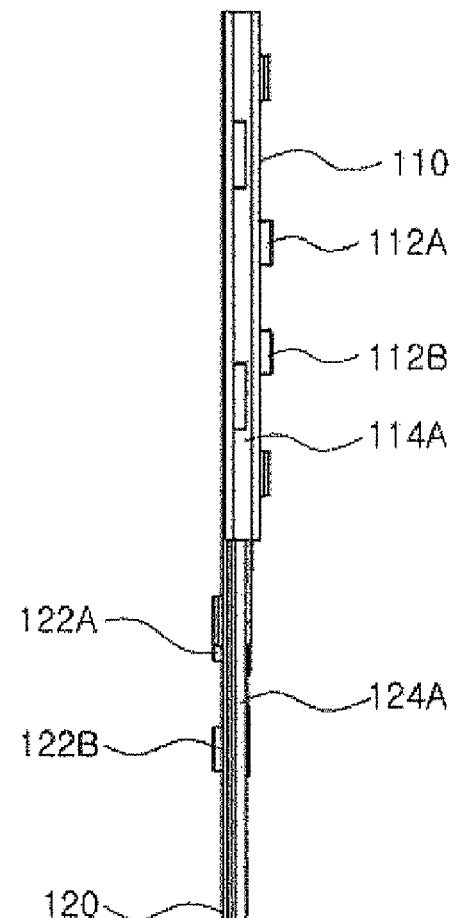
FIG. 9 is a right side view of the slider mechanism shown in FIG. 5.
Figure 10:
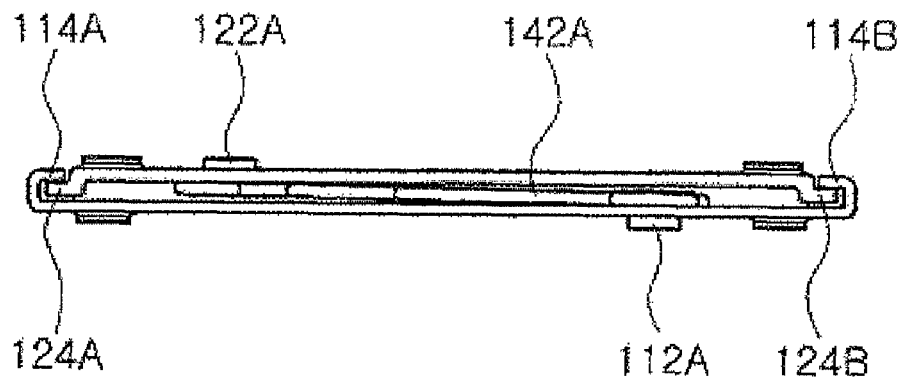
FIG. 10 is a top view of the slider mechanism shown in FIG. 5.
Figure 11:
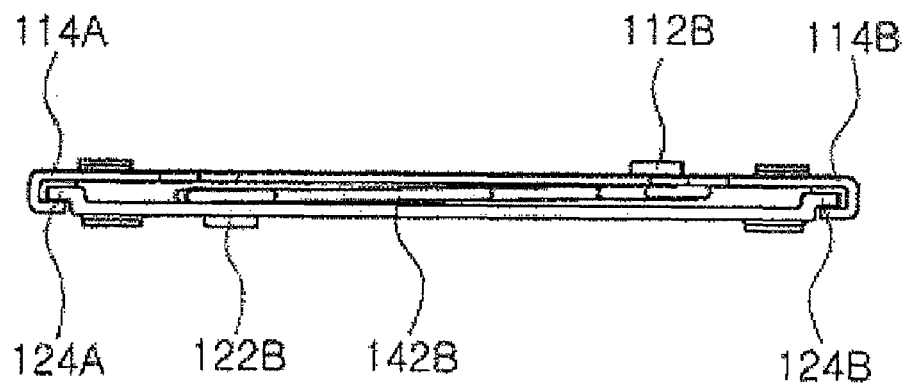
FIG. 11 is a bottom view of the slider mechanism shown in FIG. 5.
Figure 12:
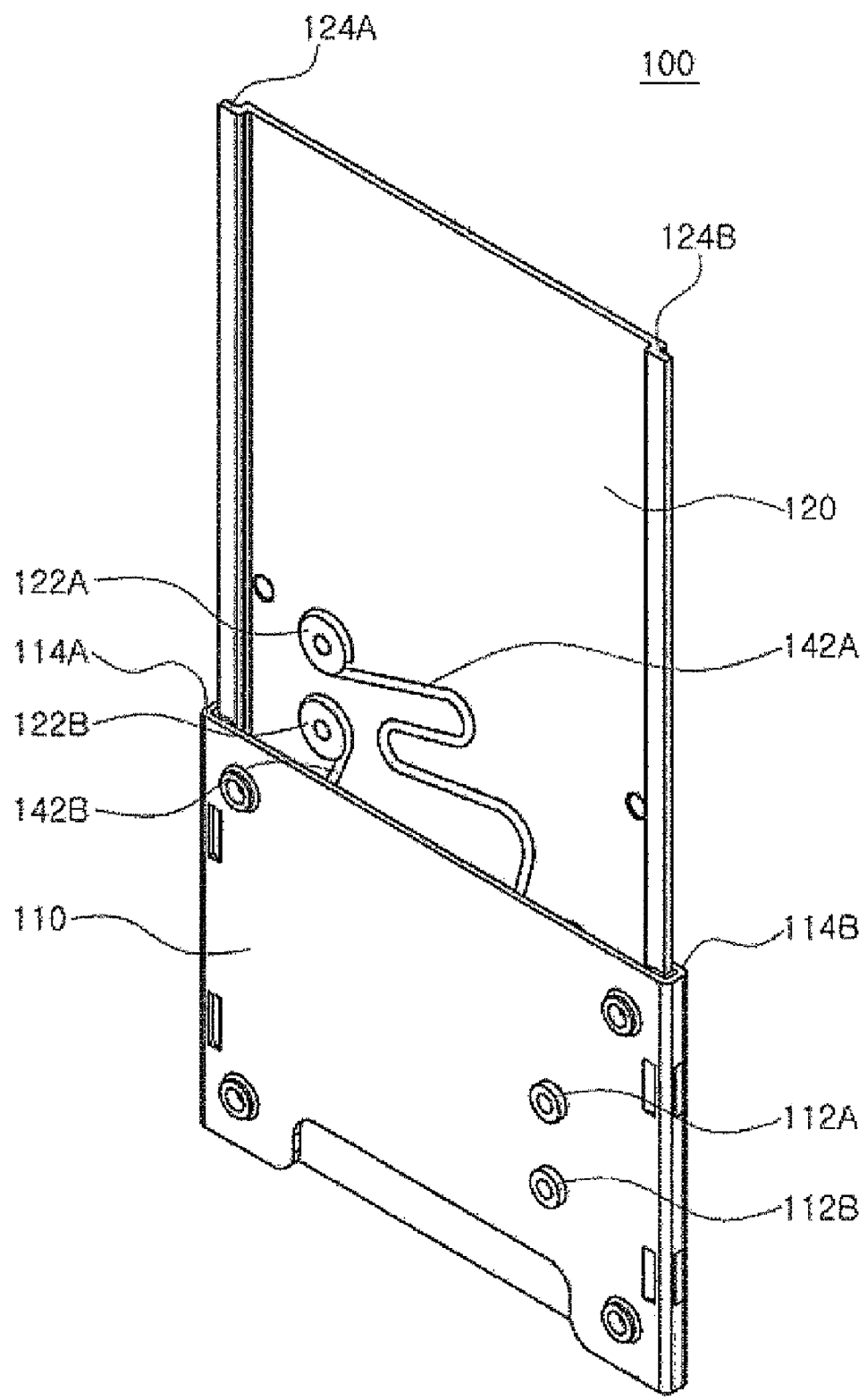
FIG. 12 is a perspective view of the slider mechanism when the portable terminal is completely opened.
Figure 13:
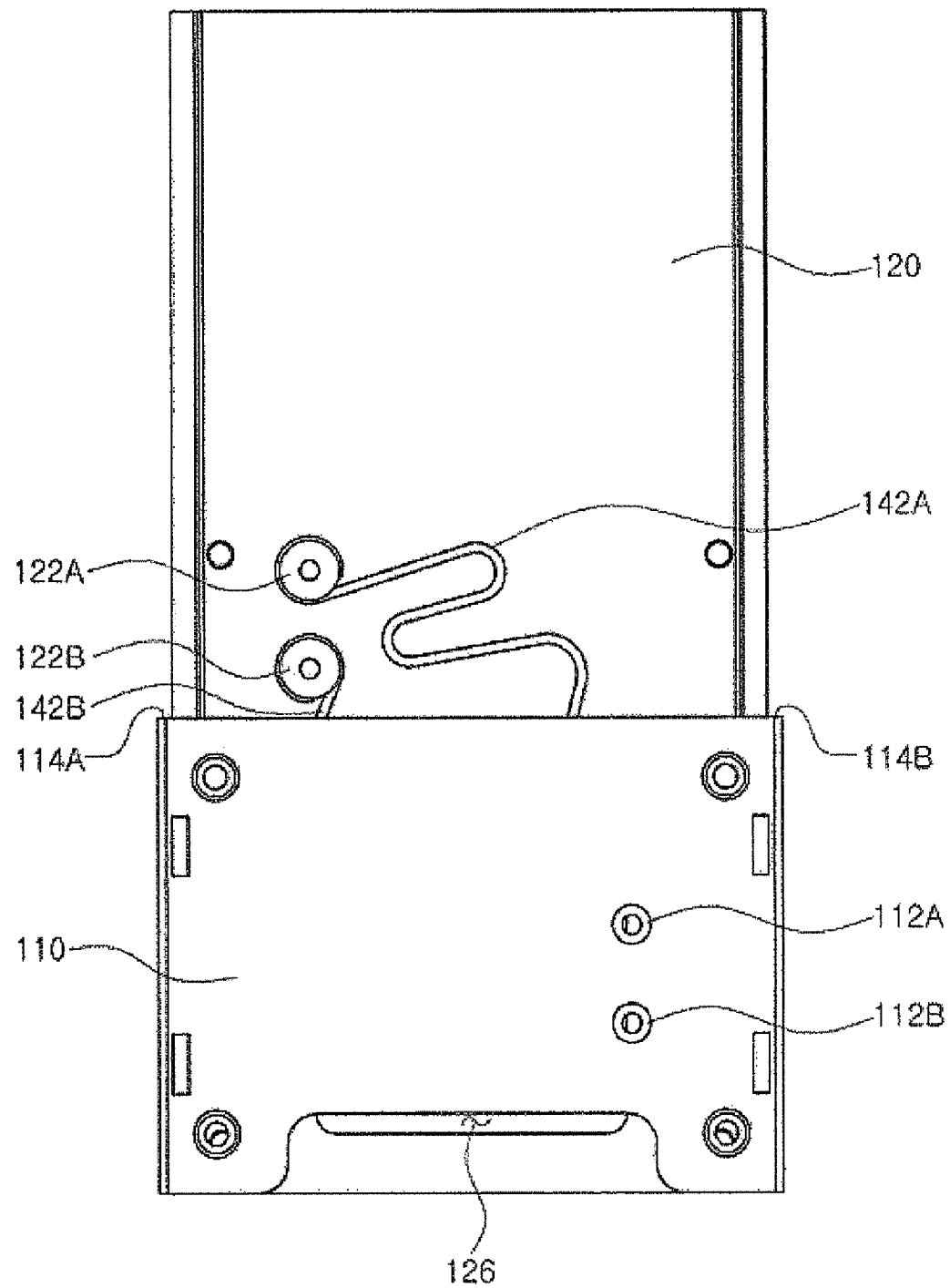
FIG. 13 is a front view of the slider mechanism shown in FIG. 12.
Figure 14:
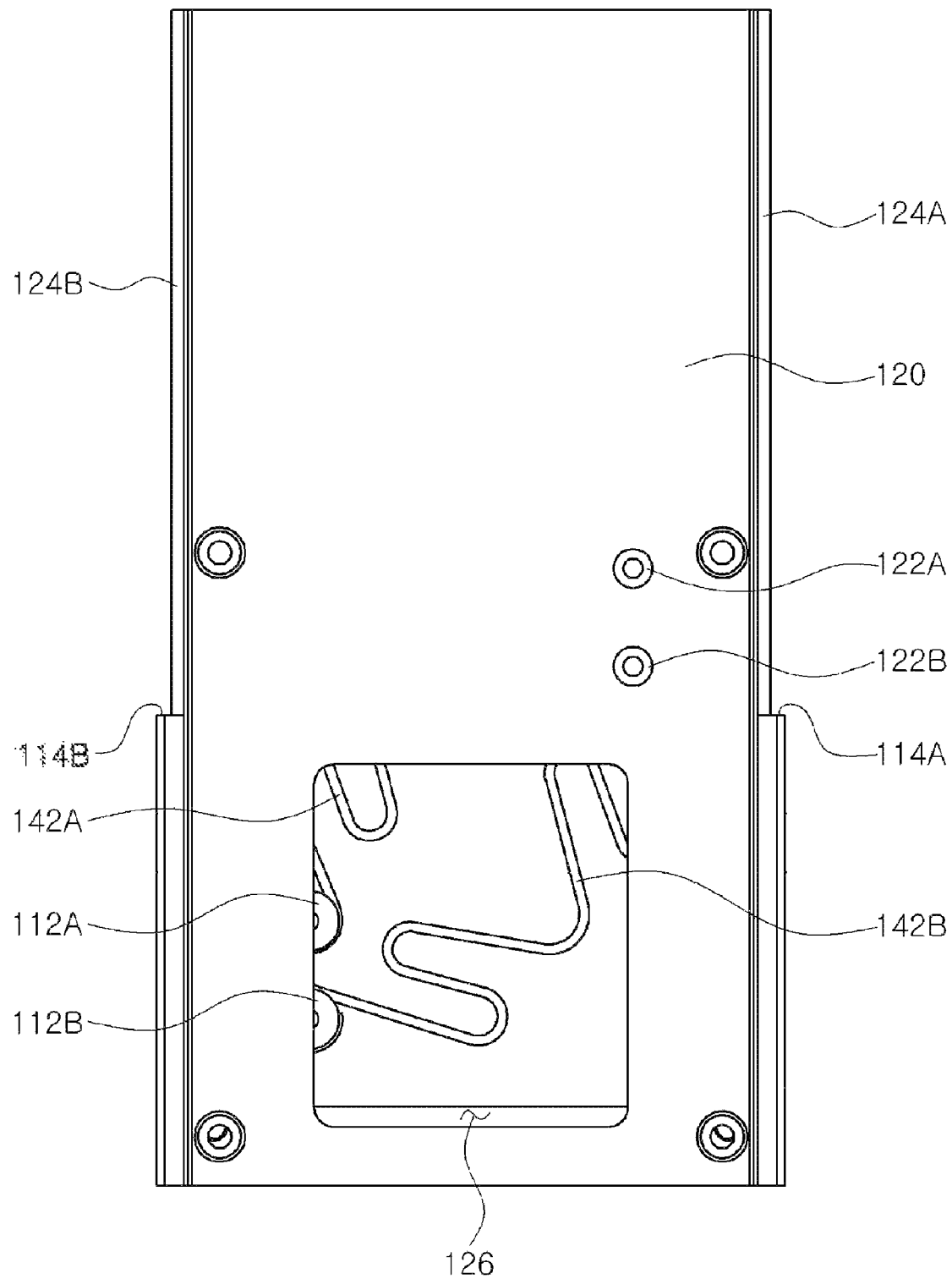
FIG. 14 is a rear view of the slider mechanism shown in FIG. 12.
Figures 15, 16:
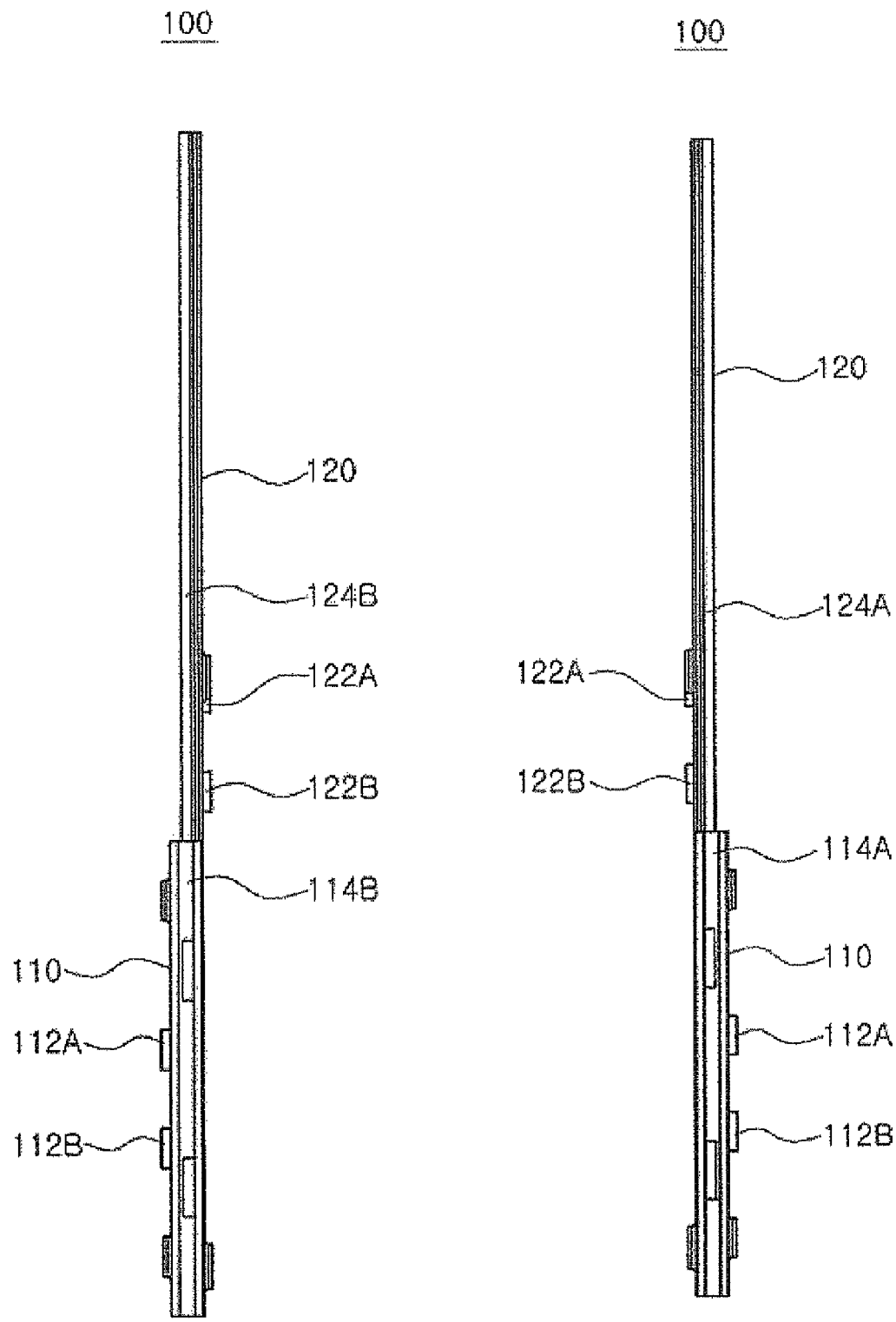
FIG. 15 is a left side view of the slider mechanism shown in FIG. 12.
FIG. 16 is a right side view of the slider mechanism shown in FIG. 12.
Figure 17:
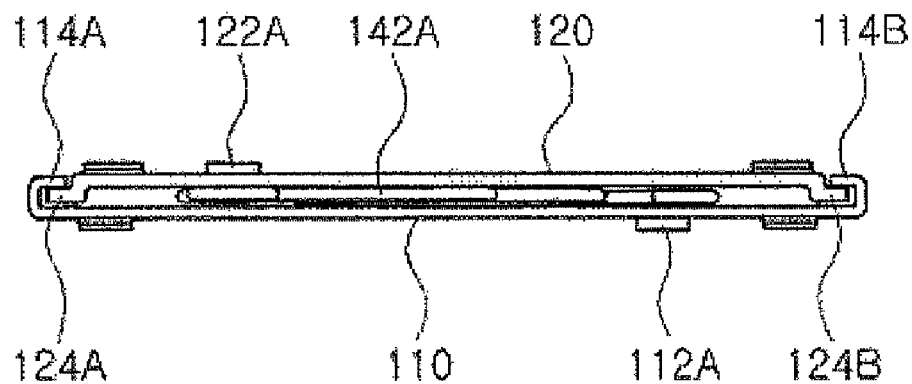
FIG. 17 is a top view of the slider mechanism shown in FIG. 12.
Figure 18:
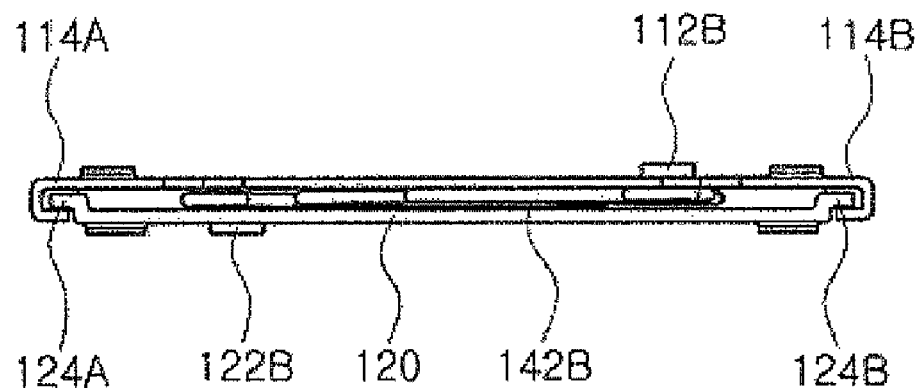
FIG. 18 is a bottom view of the slider mechanism shown in FIG. 12.

As shown in FIGS. 2 to 4, each first and second resilient member 142A and 142B is in general formed of a zigzag spring having a first zigzag portion at about the center and second zigzag portions at both sides thereof, which are designed to have different stress distributions and to be placed on the same plane. That is, the first and second zigzag portions are designed to have different spring characteristics, such as different bending angles, different spring coefficients, different pitches of zigzags, or the like. The first zigzag portion may preferably be made to have larger pitches than the second zigzag portions. In the embodiments illustrated in the figures, the zigzag spring is formed to have approximately an M-shape, but should not be limited thereto. As previously mentioned, the first and second zigzag springs 142A and 142B are installed so as not to be overlapped with each other during the sliding operations of the mechanism. Thus, during the sliding operation, the respective first and second zigzag portions have different magnitudes and distributions of stress, and thus play different roles in allowing for smooth sliding of the mechanism and in being held in place at the open and closed states before or after the sliding operation. In addition, due to the zigzag spring itself and non-overlapped installation thereof, the slider mechanism, and the portable terminals using this mechanism, can minimize its thickness (or have at least a reduced thickness), thus enabling a slim model.

In the illustrated examples, the first zigzag portion is placed in the center between two second zigzag portions, but not is limited thereto. The first and second zigzag portions may be placed in various different combinations, depending upon the applications thereof. For example, the zigzag spring may be formed of a single first zigzag portion and a single second zigzag portion.

Furthermore, the first and second zigzag springs 142A and 142B may be a circular, oval or rectangular cross-section, or other polygonal cross-sections. That is, the cross-section of the spring can be selected in various other ways to provide for various different resiliencies, for generating different elastic forces. For example, an oval cross-section can be applied to reduce the thickness of the slider mechanism while having the substantially same operational effects as in the circular cross-section illustrated in this embodiment.

As previously mentioned, the first and second zigzag portions in the zigzag spring have different spring characteristics. In order to provide for different spring characteristics, the first zigzag portion may have a different type of cross-section from that of the second zigzag portion in some embodiments. For example, the first zigzag portion may have a rectangular or oval cross-section, and the second zigzag portion may have a circular cross-section in some embodiments.

Referring to FIGS. 5 to 18, for helping achieve smooth-sliding between the slider base 110 and the sliding plate 120, the slider base 110 is preferably provided with a female guide 114A, 114B formed along the sliding direction in both lateral sides of the slider base 110. The sliding plate 120 is preferably provided with a male guide 124A, 124B formed along the sliding direction in both lateral sides of the sliding plate 120. The female guide and male guide are slidably engaged with each other so as not to be released or escaped from each other. Alternatively, the female guide and the male guide may be switched to each other, and may be implemented in various other ways as long as they can slide on each other without escaping from each other. For example, the slider base 110 may be provide with a male guide of rail form, and the sliding plate 120 may be provided with a female guide to be engaged with the male guide of rail form. As another alternative, a bar-type sliding guide member is provided in either the slider base 110 or the sliding plate 120, and a guide ring or hole is formed in the other one so as to be slidably inserted into the bar-type guide member.

Further, the inner side of the female guide 114A, 114B and the outer side of the male guide 124A, 124B may be reinforced with a plastic material, or the male and female guide themselves may be formed of a plastic material, thereby providing a further improvement in the durability of the slider mechanism 100. As a consequence, the service life of a portable terminal employing this slider mechanism can be further extended.

FIGS. 2 to 4 illustrate a resilient member used in the slider mechanism of FIG. 1 in sequence when in the closed state, during the opening and in the open state respectively of the terminal.

Referring to FIGS. 2 to 4, when the portable terminal is completely closed with the slider mechanism 100 remaining in its initial state, the respective zigzag springs 142A and 142B remain in their original state, as shown in FIG. 2. If a user tries to open the terminal, for example, by sliding the slider base 110 downwardly relative to the sliding plate 120 (in FIG. 5), the zigzag spring starts to be compressed. Accordingly, the second zigzag portions at both sides are compressed and then the central first zigzag portion (e.g., "M-shaped portion" in this exemplary embodiment) is compressed. As the slider base 110 further slides downwardly relative to the slider plate 120, the zigzag spring reaches a transition point where the opening and closing forces are balanced, as shown in FIG. 3. In other words, even slightly beyond the transition point, the slider base 110 can automatically slide down and reach the position of FIG. 12 by means of the resiliency of the zigzag spring 142A, 142B. That is, the portable terminal can be automatically and completely opened or closed, without exerting any further force by the user after the transition point.

When the slider base 110 is slightly beyond the transition point of FIG. 3, the zigzag springs 142A, 142B become strongly restored to their original state mainly by means of the central first zigzag portion (e.g., the "M-shaped portion" in the exemplary embodiment) such that the slider base 110 and the sliding plate 120 can be moved relatively away from each other. That is, the slider base 110 reaches the position of FIG. 12. In other words, the sliding operation can be rapidly completed after the transition point of FIG. 3.

FIGS. 5 to 11 show the slider mechanism 100 when the portable terminal is completely closed, i.e., a perspective view, front view, rear view, left side view, right side view, top view, and bottom view in sequence. When the portable terminal is closed, the resilient member (e.g., the zigzag springs 142A, 142B in this exemplary embodiment) remains in the state shown in FIG. 2 as previously explained and thus details thereon will not be repeated here.

FIGS. 13 to 18 show the slider mechanism 100 when the portable terminal is completely opened, i.e., a perspective view, front view, rear view, left side view, right side view, top view, and bottom view in sequence. When the portable terminal is opened, the resilient member (e.g., the zigzag springs 142A, 142B in this exemplary embodiment) remains in the state shown in FIG. 4 as previously explained and thus details thereon will not be repeated here.

As described above, exemplary embodiments of the present disclosure include a slider mechanism (e.g., 100, etc.) that employ one or more zigzag springs (e.g., 142A, 142B, etc.) to enable a slim portable terminal. A zigzag spring used in an embodiment of the present disclosure may be formed of portions having different stress distributions and elastic characteristics, thereby allowing for a more effective and smoother sliding operation and thus extending the service life of portable terminals using the slider mechanism having one or more zigzag springs.

Certain terminology is used herein for purposes of reference only, and thus is not intended to be limiting. For example, terms such as "upper," "lower," "above," "below," "top," "bottom," "upward," and "downward" refer to directions in the drawings to which reference is made. Terms such as "front," "back," "rear," "bottom," and "side," describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second," and other such numerical terms referring to structures do not imply a sequence or order unless clearly indicated by the context.

When introducing elements or features and the exemplary embodiments, the articles "a," "an," "the" and "said" are intended to mean that there are one or more of such elements or features. The terms "comprising," "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A slider mechanism comprising:
a first slider member having a first pair of rotational supports;
a second slider member slidably engaged with the first slider member and having a second pair of corresponding rotational supports;
a pair of springs, each spring having a zigzag configuration, each spring including:
a first curved end portion defining an opening configured to receive one of the rotational supports for rotatably coupling the first curved end portion to of one of the slider members;
a second curved end portion defining an opening configured to receive the other one of the corresponding rotational supports for rotatably coupling the second curved end portion to the other of the slider members;
each spring further comprising: a first zigzag portion;
at least two second zigzag portions each of which extends from a corresponding one of the first and second curved end portions to the first zigzag portion, such that the first zigzag portion is disposed generally between the second zigzag portions, each said second zigzag portion having at least one spring characteristic different from the first zigzag portion; and
the at least one zigzag spring including a plurality of curved portions alternating in curvature along the at least one zigzag spring from the first curved end portion towards the second curved end portion;
each of the first pair of rotational supports being a first rivet having a groove, and rotatably coupling the first curved end portion to the first slider member, the first curved end portion being rotatably disposed about the first rivet and supported within the groove of the first rivet; and
each of the second corresponding pair of rotational supports being a second rivet having a groove, and rotatably coupling the second curved end portion to the second slider member, the second curved end portion being rotatably disposed generally about the second rivet and supported within the groove of the second rivet;
whereby each of the springs is compressed and restored while the first and second members slide relative to each other.

2. The slider mechanism as claimed in claim 1, wherein the pair of springs are disposed so as not to interfere with each other.

3. The slider mechanism as claimed in claim 1, wherein the first zigzag portion has a spring coefficient different from that of the second zigzag portions.

4. The slider mechanism as claimed in claim 1, wherein the first zigzag portion has a zigzag pitch different from that of the second zigzag portions.

5. The slider mechanism as claimed in claim 1, wherein each spring has an 'M'-shape in general.

6. The slider mechanism as claimed in claim 1, wherein the first zigzag portion has a cross-sectional shape different from that of the second zigzag portions.

7. The slider mechanism as claimed in claim 1, wherein each spring has a circular, oval or rectangular cross-section.

8. An electronic device comprising a first body, a second body, and the slider mechanism as claimed in claim 1, wherein the first slider member is fixed to the first body and the second slider member is fixed to the second body, such that the second body is capable of sliding on the first body.

9. The electronic device as claimed in claim 8, wherein the first slider member is formed integrally with the first body of the electronic device.

10. The electronic device as claimed in claim 8, wherein the second slider member is formed integrally with the second body of the electronic device.

11. The slider mechanism as claimed in claim 1, wherein the first of each spring is about a center of the spring with the second zigzag portions at both sides thereof.

12. The slider mechanism as claimed in claim 1, wherein the first zigzag portion has larger pitches than the second zigzag portions.

13. The slider mechanism as claimed in claim 1, wherein the first and second zigzag portions cooperatively define an M-shape in general.

14. A portable communications terminal comprising a main body and a slider body, the slider body being slidably opened and closed with respect to the main body, and the slider mechanism as claimed in claim 1, wherein
the first slider member is fixed to the main body;
the second slider member is fixed to the slider body, the second slider member being linear-slidably engaged with the first slider member; and
each spring is disposed between the first and second slider members.

15. The slider mechanism of claim 1, wherein the first zigzag portion is configured with a generally M-shape.

16. The slider mechanism of claim 1, wherein the at least one spring characteristic includes at least one or more of a spring coefficient, a zigzag pitch, a bending angle, and/or a cross-sectional shape.

17. The slider mechanism of claim 1, wherein the first zigzag portion includes at least one or more of:
a spring coefficient different from that of the second zigzag portions;
a zigzag pitch different from that of the second zigzag portions; and/or
larger zigzag pitches than the second zigzag portions; and/or
a cross-sectional shape different from that of the second zigzag portions.

18. A portable communications terminal comprising the slider mechanism of claim 1.

* * * * *